United States Patent
Okamoto et al.

Patent Number: 5,092,933
Date of Patent: Mar. 3, 1992

[54] METHOD FOR THE PRODUCTION OF CONCRETE/MORTAR BY USING DRY CLATHRATE WATER AND CONCRETE/MORTAR PRODUCTS PRODUCED THEREBY

[75] Inventors: Tadashi Okamoto, Kanagawa; Toru Sato, Chiba; Taiji Kanbayashi, Nara; Chuzo Kato, Tokyo, all of Japan

[73] Assignees: Mitsui Kensetsu Kabushiki Kaisha; Shiiai Kemutekku Kabushiki Kaisha, both of Tokyo; Oosaka Yuuki Kagaku Kogyo Kabushiki Kaisha, Oosaka, all of Japan

[21] Appl. No.: 673,170

[22] Filed: Mar. 18, 1991

Related U.S. Application Data

[63] Continuation of Ser. No. 337,889, Apr. 14, 1989, abandoned.

[30] Foreign Application Priority Data

Apr. 16, 1988 [JP] Japan ................. 63-94308

[51] Int. Cl.$^5$ ............................. C04B 24/00
[52] U.S. Cl. ....................... 106/802; 106/724; 106/810; 106/819; 524/4; 524/5
[58] Field of Search ........... 106/724, 802, 810, 819; 524/4, 5

[56] References Cited

FOREIGN PATENT DOCUMENTS 0191864 8/1986 European Pat. Off. .
0241554 10/1987 European Pat. Off. .

Primary Examiner—William R. Dixon, Jr.
Assistant Examiner—Anthony J. Green
Attorney, Agent, or Firm—Wenderoth, Lind & Ponack

[57] ABSTRACT

Concrete/mortar is manufactured with a small amount of water by using a dry clathrate water mixture. The dry clathrate water is used in a state wherein the water is impregnated into a water absorbent polymer.

3 Claims, 2 Drawing Sheets

FIG. 1

| ALKYL ESTER | CARBON NUMBER OF ALKYL GROUP | ACRYLIC ESTER | METHACRYLIC ESTER |
|---|---|---|---|
| 2-ETHYLHEXYL | 8 | −85°C | −10°C |
| LAURYL | 12 | +15°C | −65°C |
| LAURYL, TRIDECYL | 12,13 | >+15°C | <−46°C |
| TRIDECYL | 13 | +20°C | −46°C |
| STEARYL | 18 | >+35°C | +38°C |

FIG. 2

| SAMPLE NO. | WATER ABSORBENCY (g/g) | | PARTICLE SIZE OF DRY POLYMER (μm) | PARTICLE SIZE WHEN WATER IS ABSORBED (mm) | PARTICLE INDEPENDENCE WHEN WATER IS ABSORBED |
|---|---|---|---|---|---|
| | ION EXCHANGE WATER | 0.9% SALT WATER | | | |
| EXAMPLE-1 | 125 | 33 | 120 | 0.48 | O |
| 2 | 110 | 30 | 50 | 0.20 | O |
| 3 | 150 | 33 | 170 | 0.62 | O |
| 4 | 180 | 35 | 90 | 0.30 | O |
| 5 | 200 | 35 | 100 | 0.31 | O |
| 6 | 80 | 26 | 120 | 0.45 | O |
| COMPARISON EXAMPLE-1 | 540 | 58 | 110 | 0.39 | △ |
| 2 | 160 | 37 | MEASUREMENT IMPOSSIBILITY (THE SECOND CONDENSATION) | MEASUREMENT IMPOSSIBILITY | × |
| 3 | 260 | 42 | 500 | 1.6 | × |

5,092,933

METHOD FOR THE PRODUCTION OF CONCRETE/MORTAR BY USING DRY CLATHRATE WATER AND CONCRETE/MORTAR PRODUCTS PRODUCED THEREBY

This application is a continuation of now abandoned application Ser. No. 07/337,889 filed on Apr. 14, 1989.

BACKGROUND OF THE INVENTION

This invention relates to a method for the production of fine grain ice or dry clathrate water for manufacture concrete/mortar, a method for the production of concrete/mortar by using fine grain ice or dry clathrate water and concrete/mortar products manufactured by said method. Fine grain ice and dry clathrate water for manufacturing concrete/mortar produced by this invention are used when concrete/mortar is manufactured by the use of a small amount of water.

Thus, concrete/mortar can now be easily manufactured by making use of fine grain ice or dry clathrate water at a place where it is difficult to supply water.

In the case where concrete/mortar is manufactured by a conventional method, much more water is used than the amount of water necessary for hydration of cement in order to uniformly mix and temper cement and water and to keep good flowability as well. However, there is an inconvenience in this method in that strength and durability of concrete/mortar after solidification are lower than the concrete/mortar produced by use of the amount of water close to theoretical hydration quantity.

For this reason, the technique to mix cement or cement and aggregate with fine grain ice instead of water has been studied. The features are as follows:

1) Since powder mixture can be performed with cement, mixing can be performed in low water cement ratio.
2) Loss in slump in proportion to the passage of time is small after mixing.
3) The control of temperature for mass concrete can be easily performed.

In the case where this concrete mixing technique is actually applied, however, it is necessary to manufacture fine grain ice and this method presents a problem. In a conventional method, fine grain ice is obtained by crushing square ice. In the case where fine grain ice is obtained by crushing square ice, the defects are as follows:

1) In the case where a large amount of fine grain ice is fed, a big plant equipped with special devices such as an ice crusher and a slicer is necessary.
2) Fine grain ice must be kept at low temperature until it is used and an ice storage unit is necessary to do so. Therefore, the control of the manufacturing process is troublesome and the cost is high.

SUMMARY OF THE INVENTION

The present inventors have conducted studies in order to avoid these conventional defects and perfected a method to accomplish this as follows. That is, when fine grain ice or dry clathrate water are used for a cement mixture, concrete/mortar can be easily manufactured by using a small amount of water without the above-mentioned ice storage unit. On this occasion, fine grain ice is made in such a manner that water is impregnated into a water absorbent polymer, capable of keeping independent fine grains by incorporating water in the structure in the water absorbing state, to freeze. And, dry clathrate water is made in such a manner that water is impregnated into the water absorbent polymer.

The method for the production of fine grain ice or dry clathrate water for manufacturing of concrete/mortar in the present invention has the following characteristics:

1) Fine grain ice or dry clathrate water particles having stable particle size can be easily manufactured.
2) It is unnecessary to keep fine grain ice at low temperature until it is used and it can be used as is or by freezing just before mixture.
3) It is unnecessary to manufacture it at a specified place and manufacture can be easily performed at an optional place in the available time.
4) The method can be easily applied to an existing ready-mixed concrete plant.
5) Water can be transported as fine particles to a place where it is impossible to supply water.

The method for the production of concrete/mortar in the present invention has the following characteristics:

1) Low water cement ratio of high strength concrete/mortar can be easily manufactured.
2) Continuous production is easy to achieve by extrusion molding and roller molding. And, products can be easily enlarged in length.
3) Since water absorbent polymer is mixed in with the cement, a remarkable effect is observed in the prevention of surface dew condensation and efflorescence.

BRIEF DESCRIPTION OF THE DRAWINGS

FIG. 1 is a table which depicts the glass transition point of certain monomers; and FIG. 2 is a table which depicts the result of an evaluation of the water absorbent polymers in Examples 1 through 6 and Comparison Examples 1 through 3.

DESCRIPTION OF THE PREFERRED EMBODIMENTS

The water absorbent polymer for use in the present invention is obtained by dissolving acrylic copolymer in an aliphatic hydrocarbon to form a solution, and dispersing acrylic acid and its alkali metallic salt aqueous solution in said solution. Polymerization is performed by a W/O type suspension polymerization method and crosslinking is then performed in the presence or absence of an inorganic compound by means of crosslinking agent, followed by drying.

An acrylic copolymer to be used as a dispersing agent when the water absorbent polymer for use in the present invention is manufactured, is a copolymer in which the following are components.

(a) alkyl acrylate or alkyl methacrylate monomers in which the carbon number of alkyl groups is 8 or more are present at 40–95 weight percent
(b) one or more kinds of monomers selected from acrylic acid derivatives or methacrylic acid derivatives or acrylic amide derivatives or methacrylic amide derivatives containing carboxyl groups, amino groups, quaternary ammonium groups or hydroxyl groups are present at 5–40 weight percent
(c) unsaturated monomers capable of copolymerizing with the above-mentioned (a), (b) are present at 0–40 weight percent Alkyl acrylates or alkyl methacrylates in component (a) are suitable if the carbon number of the alkyl groups is 8 or more and monomers which are commercially available are 2-ethylhexyl acrylate, 2-ethylhexyl methacrylate, lauryl acrylate, lauryl methacrylate, tridecyl acrylate, tridecyl methacrylate, mixture of lauryl acrylate and tridecyl acrylate, stearyl acrylate, stearyl methacrylate and the like.

In selecting component (a), the higher a glass transition point is, the harder it is for bead blocking to occur when the dispersing agent is synthesized in an O/W type suspension polymerization. Therefore, a higher glass transition point is convenient. The glass transition point of each monomer is shown in FIG. 1.

For instance, 2-ethylhexyl methacrylate, lauryl acrylate, mixture of lauryl acrylate and tridecyl acrylate, tridecyl acrylate, stearyl acrylate, stearyl methacrylate and the like are available for use herein.

Acrylic acid derivatives or methacrylic acid derivatives or acrylic amide derivatives or methacrylic amide derivatives containing carboxyl groups, amino groups, quaternary ammonium groups or hydroxyl groups in component (b) include acrylic acid, methacrylic acid, itaconic acid, dimethylaminoethyl acrylate, dimethylaminoethyl methacrylate, diethylaminoethyl acrylate, diethylaminoethyl methacrylate, acryloyloxyethyltrimethylammonium chloride, methacryloyloxyethyltrimethylammonium chloride, 2-hydroxyethyl acrylate, 2-hydroxyethyl methacrylate, 2-hydroxypropyl acrylate, 2-hydroxypropyl methacrylate, acrylamide, dimethylacrylamide, dimethylaminopropylacrylamide, dimethylaminopropylmethacrylamide, acrylamidepropyltrimethylammonium chloride methacrylamidepropyltrimethylammonium chloride and the like.

Monomers for use as component (c) are alkyl methacrylates in which the glass transition point is high, having affinity for aliphatic hydrocarbon solvent and the monomers in which the carbon number of alkyl group is less than 5 and vinyl acetate are examples. For instance, methyl methacrylate, ethyl methacrylate, isopropyl methacrylate, n-butyl methacrylate, isobutyl methacrylate and vinyl acetate are suitable and methyl methacrylate, ethyl methacrylate and isobutyl methacrylate are also suitable.

The constitution ratio of the components (a), (b) and (c) largely influences dispersion solubility to aliphatic hydrocarbon solvent, colloid dispersibility of polymerization and the property of the water absorbent polymer, for instance, water absorbency, particle independence when water is absorbed, particle strength and particle size.

In general, component (a) is present at 40–95 weight percent, component (b) is present at 5–40 weight percent and component (c) is present at 0–40 weight percent as suitable values. It is preferred that component (a) is present at 45–70 weight percent, component (b) is present at 5–25 weight percent and component (c) is present at 20–40 weight percent. In the case where the component (a) is less than 40 weight percent, the dispersion solubility to solvent is lowered. In the case where the component (a) is more than 95 weight percent, the colloid dispersibility becomes relatively worse when component (b) is less than 5 weight percent. In both cases, it is difficult to continue W/O type suspension polymerization. The component (a) has a tendency such that the higher the percentage by weight, i.e. in the range between 40 and 95, the better the dispersion solubility to solvent, particle independence of water absorbent polymer when water is absorbed and particle strength become. In the case where the component (b) is less than 5 weight percent, the colloid dispersibility gets worse as described before. In the case where component (b) is more than 40 weight percent, the dispersion solubility to solvent is lowered. In both cases, it is difficult to continue W/O type suspension polymerization.

The component (b) has a tendency such that the higher the percentage by weight, i.e. in the range between 5 and 40, the better the colloid dispersibility of polymerization is and the more the water absorbing rate of water absorbent polymer accelerates. On the contrary, in this case, the particle independence when water is absorbed and the particle strength are lowered and the particle size becomes fine. In the case where the component (c) is more than 40 weight percent, the ratio of the component (a) is relatively lowered and the dispersibility to solvent becomes worse. The higher percentage by weight is in the range between 0 and 40, the higher the particle strength of water absorbent polymer is.

Acrylic copolymer which is used as a dispersing agent in the present invention is synthesized by means of an O/W type suspension polymerization method. In solution polymerization, there are a few cases where solvent remains or the function as dispersing agent is inferior due to low molecular weight of the resultant polymer.

An example of O/W type suspension polymerization method is as follows. That is, partially saponified polyvinyl alcohol is heated and dissolved in ion exchange water. After the atmosphere is replaced with $N_2$, a solution in which an initiator of the azo type or peroxide type is dissolved is added dropwise and is dispersed in the monomer of components (a), (b) and (c) and the polymerization is finished by continuation of heating. After cooling, solid matter is filtered and washed and bead-like acrylic copolymer, that is, dispersing agent, is obtained by drying under reduced pressure.

The dispersing agent obtained by the above-described method is dispersed into the dissolved in the aliphatic hydrocarbon solvent of W/O type suspension polymerization.

The dispersing agent is used in the 0.1 to 10 weight percent range with respect to acrylic acid and its alkali metallic salt monomer and the preferred range is 0.5 to 5 weight percent. When the quantity of dispersing agent is less than 0.1 weight percent, the colloid dispersibility of polymerization is labilized. When it is more than 10 weight percent, the fineness of particle size becomes the factor with respect to economic demerit.

Acrylic acid and its alkali metallic salt aqueous solution for use in the present invention is adjusted in such a manner that acrylic acid monomer is partially neutralized by means of aqueous solution such as sodium hydroxide and potassium hydroxide. It is preferred in consideration of water absorbency power and safety that the degree of neutralization is 60 to 85%. And, the concentration of monomer in aqueous solution is 35 to 75 weight percent and the preferred concentration is 40 to 70 weight percent.

In the present invention, there is no difficulty that unsaturated monomer capable of copolymerizing with acrylic acid and its acrylic acid alkali metallic salt monomer is copolymerized with acrylic acid and its acrylic acid alkali metallic salt monomer during the manufacture of water absorbent polymer.

In the case where acrylic acid is polymerized with its alkali metallic aqueous solution by the W/O type suspension polymerization method in the present invention, the initiator is of the self-crosslinking type in which crosslinking agent monomer is not used. Therefore, the preferred initiator is water soluble persulfate such as potassium persulfate and ammonium persulfate and hydrogen peroxide. The quantity of initiator for use is 0.1 to 2.0 weight percent to monomer and the preferred quantity is 0.2 to 1.0 weight percent.

Aliphatic hydrocarbon solvent of W/O type suspension polymerization in the present invention is aliphatic hydrocarbon such as n-pentane, n-hexane, n-heptane and n-octane, alicyclic hydrocarbons such as cyclohexane, methylcyclohexane and decalin. The preferred one is n-hexane, n-heptane and cyclohexane.

When water absorbent polymer is manufactured for the present invention, the other important factor is that crosslinking reaction is performed by means of crosslinking agent in the presence or in the absence of inorganic compound after W/O type suspension polymerization.

It is permissible that the crosslinking agent for use in the present invention is the compound having two or more functional groups capable of reacting with a carboxyl group (or carboxylate group). Such crosslinking agent is polyglycidyl ether such as ethylene glycol diglycidyl ether, polyethylene glycol diglycidyl ether and glycerin triglycidyl ether, haloepoxy compound such as epichlorohydrin and α-methyl chlorohydrin, a kind of polyaldehyde such as glutaraldehyde and glyoxal and the like. The preferred one is ethylene glycol glycidyl ether.

The amount of additive of the crosslinking agent differs in kinds of crosslinking agent and kinds of dispersing agent and the proper range is usually 0.05 to 2 weight percent to acrylic acid and its alkali metallic salt monomer. When the quantity of the above-described crosslinking agent for use is less than 0.05 weight percent, the particle independence when water is absorbed and the particle strength are bad. When it is more than 2 weight percent, the crosslinking density is too high. Therefore, the water absorbency is remarkably lowered.

In case of crosslinking reaction, the particle independence when water is absorbed rises all the more for adding inorganic compound. Inorganic compounds are, for instance, white carbon, talc, hydrotalcite, pulverized silica (commercially available under the trademark "Aerosil" made by NIPPON AEROSIL KABUSHIKI KAISHA). On this occasion, it causes no difficulty that a surface active agent is added. And, well known nonionic surface active agents and the like are used.

The method of performing the crosslinking reaction is to add crosslinking agent during azeotropic distillation and heating and drying under reduced pressure as well known and the addition during azeotropic distillation is easy.

The water absorbent polymer for use in the present invention is different from commercially produced polymer and shows particle independence when water is absorbed. The more component (a) acrylic copolymer dispersing agent employed and the more crosslinking agent employed, the greater the effects observed. It can, therefore, be presumed that slippage of water absorbed polymer affects the above-described particle independence. The component (a) dispersing agent upgrades the water repellency of the water absorbed polymer as does upgrading the crosslinking rate of the polymer, while the crosslinking agent increases the water absorbing rate and decreases surface tacking. By these effects, the water absorbed bead-like polymer particles slip by each other, become porous and appear to affect particle independence and flowability, since little water as binder is present.

Fine grain ice for production of concrete/mortar in the present invention is obtained in such a manner that the above-mentioned water absorbent polymer absorbs the necessary quantity of water to freeze so as to keep independent fine grains. It is easily manufactured. Water can be absorbed up to the water absorbency of polymer (100 to 200 times of water absorbent polymer weight in ion exchange water). And, dry clathrate water for production of concrete/mortar is obtained only in such a manner that the above-mentioned water absorbent polymer absorbs the necessary quantity of water. It is desirable that the amount of water to be absorbed is less than half of the water absorbency of polymer in order to keep independent fine grains.

The particle size of fine grain ice or dry clathrate water can be freely varied in the 0.03 to 3.0 mm range by changing the particle size of water absorbent polymer and the amount of water to be absorbed and can be selected in accordance with the working conditions when the cement is mixed.

Concrete/mortar is manufactured in such a manner that fine grain ice or dry clathrate water of the present invention is mixed with cement or cement and aggregate in powder condition and after is expelled to the outer portion by means of pressure molding or extrusion molding method so as to cause hydration with the surrounding cement.

Thereafter, the production method of the present invention will be concretely explained according to the examples. However, the present invention is not restricted by these examples.

Water absorbency, particle size and particle independence when water is absorbed when obtained by the following operations as shown below.

The value of water absorbency in ion exchange water was obtained in such a manner that dry polymer 0.5 g was dissipated in ion exchange water 1 l., the swelling polymer weight (W) obtained by filtering by means of 80-mesh wire gauze after standing for twenty-four hours was measured and this value was divided by the original dry polymer weight (Wo). This is to say, it was decided that the water absorbency of ion exchange water (g/g) was W/Wo.

The value of the water absorbency of 0.9% salt water was obtained in such a manner that dry polymer (0.2 g) was dispersed in 0.9% salt water (60 g), the swelling polymer weight (W) obtained by filtering by means of 100-mesh wire gauze after standing for twenty minutes was measured and this value was divided by the original dry polymer (Wo). That is, it was decided that the water absorbency of 0.9% salt water (g/g) was W/Wo.

The particle size of water absorbent polymer (in dry condition) was measured by means of an automatic grading distribution measuring apparatus CAPA-300 made by HORIBA SEISAKUSHO KABUSHIKI KAISHA by using the decanter method. And, it was decided that the median on a basis of the area was particle size.

It was decided that the particle size of water absorbed polymer was the average obtained on the basis of photography with an optical microscope after ion exchange water (50 cc) was added to dry polymer (1.0 g) and the polymer absorbed all of the water. The particle independence when water was absorbed was judged by the following standard:

○: Each particle is independent and has flowability.
Δ: Each particle is partially dependent and inferior in flowability.
x: Each particle shows gelation dependence perfectly and has no flowability.

The composition examples of dispersing agent (acrylic copolymer) will be shown hereinafter.

COMPOSITION EXAMPLE 1

Ion exchange water 150 g was fed into a 500 ml separatory flask equipped with an agitator, a reflux condenser, a dropping funnel, a thermometer and a nitrogen gas introduction tube, partial saponified polyvinyl alcohol (GH-23 made by NIHON GOHSEI KAGAKU KABUSHIKI KAISHA) 0.2 g was added as a dispersing agent and the atmosphere was replaced with $N_2$ after heating and dissolution.

On the other hand, azobisdimethylvaleronitrile 1.0 g was added to a mixture of lauryl acrylate and tridecyl acrylate (LTA made by OHSAKA YUKI KAGAKU KABUSHIKI KAISHA) 32.5 g, hydroxy ethyl methacrylate 10.0 g and methyl methacrylate 17.5 g in a conical flask in advance to dissolve; it was added dropwise into the above-mentioned separatory flask for one hour under nitrogen bubbling, and it was maintained for 5 hours at 65° C., whereby the reaction was completed. The solid matter was filtered after cooling to wash and to dry under reduced pressure and the bead-like dispersing agent (1) was obtained.

COMPOSITION EXAMPLE 2

The bead-like dispersing agent (2) was obtained by operating in the same way as Comparative Example 1 except using mixture of lauryl acrylate and tridecyl acrylate 25.0 g, methacrylic acid 5.0 g, dimethylaminoethyl methacrylate 5.0 g and methyl methacrylate 17.5 g.

COMPOSITION EXAMPLE 3

The bead-like dispersing agent (3) was obtained by operating in the same way as Composition Example 1 except using stearyl methacrylate 30 g, dimethylaminopropyl methacrylamide 10.0 g and methyl methacrylate 10.0 g.

The examples of water absorbent polymer will be shown hereinafter.

EXAMPLE 1

N-hexane 360.7 g and the dispersing agent (1) 4.32 g were fed in a 1 l. separatory flask equipped with an agitator, a reflux condenser, a dropping funnel, a thermometer and a nitrogen gas introduction tube, the temperature was raised to 50° C. to disperse and dissolve the materials and the atmosphere was replaced with $N_2$.

On the other hand, acrylic acid 72.0 g was partially neutralized by means of sodium hydroxide 32.2 g dissolved in ion exchange water 103.6 g in a conical flask in advance and potassium persulfate 0.24 g was dissolved therein at room temperature. This monomer aqueous solution was dropped in the above-described separatory flask under nitrogen bubbling at an agitation speed of 300 rpm for an hour. After reflux for two hours, 30% aqueous hydrogen peroxide 0.1 g was added thereto and polymerization was perfectly completed by continuing reflux for an hour. Thereafter, ethylene glycol diglycidyl ether 0.73 g was added thereto, azeotropic distillation was performed to dry under reduced pressure after filtration and a white bead-like polymer was obtained. And, there was little attachment of polymer particles in the separatory flask.

The obtained dry polymer showed that the water absorbency to ion exchange water was 125 (g/g), the water absorbency to 0.9% salt water was 33 (g/g), the particle size in dry condition was 120 μm and the particle size when water was absorbed was 480 μm. And, the particle independence when water was absorbed was shown.

EXAMPLES 2 AND 3

White bead-like polymer was obtained by operating in the same way as in Example 1 except using the dispersing agent (2), (3) obtained in Composition Examples 2, 3 instead of the dispersing agent (1) of Example 1. And, there was little attachment of polymer in the separatory flask.

EXAMPLE 4

White bead-like polymer was obtained by operating in the same way as in Example 1 except using cyclohexane instead of n-hexane of Example 1. And, there was little attachment of polymer particles in the separatory flask.

EXAMPLES 5-6

White bead-like polymer was obtained by operating in the same way as in Example 1 except changing ethylene glycol diglycidyl ether 0.73 g in Example 1 into 0.18 g and 1.46 g. And, there was little attachment of polymer in the separatory flask.

COMPARISON EXAMPLE 1

White bead-like polymer was obtained by operating in the same way as in Example 1 except not adding ethylene glycol diglycidyl ether of Example 1. And, there was little attachment of polymer in the separatory flask.

COMPARISON EXAMPLE 2

White powdery polymer was obtained by operating in the same way as in Example 1 by using sorbitan monolaurate instead of the dispersing agent (1) of Example 1. And, the attachment of polymer appeared at the wall surface and the agitating blade in the separatory flask.

COMPARISON EXAMPLE 3

Commercially available product AQUALIC CA-W (made by NIHON SHOKUBAI KAGAKU KOGYO KABUSHIKI KAISHA)

The result of evaluation in Examples 1 through 6 and Comparison Examples 1 through 3 will be shown in FIG. 2.

The examples of production methods of fine grain ice and concrete/mortar will be shown hereinafter.

EXAMPLE A FINE GRAIN ICE

Drinking water 100 kg was fed in a 100 l. vessel equipped with an agitator and the water absorbent polymer 1.0 kg of Example 1 was gradually added thereto during agitation. After water was absorbed, agitation was stopped and the fine grain polymer which absorbed water was subjected to freezing. Then, the frozen polymer formed independent fine grain ice by simple mechanical operation and was agitated by a mixer with sand and cement in the following proportions to form mortar:

cement:fine grain ice:quartz sand (bone dry) = 100:28:20

This mortar was formed into a plate which was 50 mm wide and 12 mm thick by a vacuum deaeration type extrusion molding machine. Five specimens which were 350 mm long were made by using this plate and a bending tension test was performed after curing at room temperature for 14 days. On this occasion, the bending tension strength (kg/cm$^2$) was 185.3, 211.1, 237.2, 191.0 and 177.9 and the average was 200.5 kg/cm$^2$.

EXAMPLE B FINE GRAIN ICE

After water was absorbed, powder mixture was performed in the following ratio by using frozen fine grain polymer by the same method as the above-described one.

cement:fine grain ice:quartz sand (bone dry) = 100:24:20

Thereafter, a plate which was 50 mm wide and 12 mm thick was formed by means of a vacuum deaeration type extrusion molding machine. The bending tension strength (kg/cm$^2$) of this plate which was cured for 14 days at 20° C. in a room was 249.5, 220.1 and 220.3 and the average was 230.0 kg/cm$^2$.

EXAMPLE C FINE GRAIN ICE

After water was absorbed, powdery mixture was formed in the following ratio by using the frozen fine grain polymer in the same manner as the above-mentioned to form a plate by means of a vacuum deaeration type extrusion molding machine.

cement:fine grain ice:quartz sand (bone dry) = 100:32:20

On this occasion, the bending tension strength (kg/cm$^2$) of this plate after curing at 20° C. in a room for 14 days was 176.8, 157.0 and 146.1 and the average was 160.0 kg/cm$^2$.

EXAMPLE D DRY CLATHRATE WATER

Drinking water 50 kg was fed in a 100 l. vessel equipped with an agitator and water absorbing polymer 1.0 kg was gradually added during agitation. After water was absorbed, agitation was stopped to manufacture dry clathrate water. By using this dry clathrate water, agitation was performed by means of a mixer using the following proportions (ratio) to manufacture mortar.

cement:dry clathrate water:quartz sand (bone dry) = 100:28:20

The bending test result of the plate manufactured and cured in the same manner as the above-mentioned Example A by using this mortar was 218.4, 179.5 and 180.9 and the average was 192.9 kg/cm$^2$.

EXAMPLE E DRY CLATHRATE WATER

The same method as in Example D was performed.
The bending test result of the plate in the following ratio was 241.5, 216.8 and 206.3 and the average was 221.5 kg/cm$^2$.

cement:dry clathrate water:quartz sand (bone dry) = 100:24:20

EXAMPLE F DRY CLATHRATE WATER

The same method as in Example D was performed.
The bending test result of the plate in the following ratio was 166.3, 147.0 and 146.1 and the average was 153.1 kg/cm$^2$.

cement:dry clathrate water:quartz sand (bone dry) = 100:32:20

The present invention is explained according to the examples hereinbefore.

However, the present invention is not limited to these examples. Accordingly, it is apparent that there are other variations and modifications which fall within the scope of the present invention.

We claim:

1. A method for the production of concrete/mortar, which consists essentially of:
    a) mixing water with polymer particles capable of retaining their particulate shape when substantial quantities of water are absorbed therein, said particles being produced by a process which comprises:
        i) forming an acrylic copolymer dispersing agent having an alkyl acrylate or methacrylate monomer having an alkyl group of eight or more carbon atoms as main component;
        ii) dissolving said acrylic copolymer of i) in a liquid aliphatic hydrocarbon,
        iii) partially neutralizing an acrylic acid monomer in aqueous solution with an alkali to form an aqueous solution of partially neutralized acrylic acid,
        iv) adding the aqueous alkali solution of partially neutralized acrylic acid of iii) to the solution of acrylic copolymer of ii) and polymerizing the resultant mixture by water/oil suspension polymerization, and
        v) subjecting the resultant polymer of iv) to a cross-linking reaction in the presence of a cross-linking agent and in the presence or absence of a particulate inorganic compound;
    b) mixing cement or cement and aggregate with said product of step a) and
    c) expelling the water absorbed in said polymer particles in the mixture of 'b) to the outside thereof by a molding method so as to cause hydration of said cement.

2. The method according to claim 1 wherein said molding method comprises pressing or extrusion.

3. The method according to claim 1 wherein said polymer particles containing water of step a) are frozen prior to step b) and melted when desired to cause hydration of said cement.

* * * * *